United States Patent [19]

Tucholski et al.

[11] Patent Number: 4,672,010
[45] Date of Patent: Jun. 9, 1987

[54] TERMINAL PIN-COLLECTOR PLATE ASSEMBLY FOR HERMETICALLY SEALED CELLS

[75] Inventors: Gary R. Tucholski, Parma Heights; Earl J. Chaney, Jr., Medina, both of Ohio

[73] Assignee: Eveready Battery Company, St. Louis, Mo.

[21] Appl. No.: 886,620

[22] Filed: Jul. 18, 1986

[51] Int. Cl.$^4$ ............................................. H01M 2/12
[52] U.S. Cl. ................................. 429/56; 429/181; 429/197; 429/218; 429/82
[58] Field of Search .............. 429/56, 53, 72, 82, 429/178, 181, 185, 197, 218, 174

[56] References Cited

U.S. PATENT DOCUMENTS

| | | | |
|---|---|---|---|
| 4,010,406 | 3/1977 | West et al. | 429/53 X |
| 4,115,629 | 9/1978 | Dey et al. | 429/56 |
| 4,127,702 | 11/1978 | Catanzarite | 429/56 |
| 4,567,118 | 1/1986 | Connelly | 429/53 |
| 4,592,970 | 6/1986 | Zupancic | 429/82 |

Primary Examiner—Anthony Skapars
Attorney, Agent, or Firm—Richard C. Cooper

[57] ABSTRACT

An electrochemical cell having a cell housing that contains an active anode material and an active cathode material. An electrically conductive current collector member within the cell housing is in electrical contact with one of the active materials, and an electrically conductive pin member having a first portion protrudes from the cell through an orifice in the cell housing. A sealing member is disposed in the the orifice between the pin member and the cell housing to seal the interior of the cell from its surroundings. A second portion of the electrically conductive pin member is both releasably secured within an aperture in the current collector member and in electrical contact with the current collector member, so that when the pressure within the cell exceeds a predetermined pressure limit, the pin member is ejected from the cell and the excessive internal pressure is then vented.

17 Claims, 4 Drawing Figures

TERMINAL PIN-COLLECTOR PLATE ASSEMBLY FOR HERMETICALLY SEALED CELLS

BACKGROUND OF THE INVENTION

This invention relates to an hermetically sealed galvanic cell that has an improved terminal pin - collector plate assembly to facilitate venting of the cell.

Reliable, long service life cells or batteries have been developed for portable electrically powered devices such as tape recorders, playback machines, radio transmitters and receivers. Electrochemical cell systems for such devices provide a long service life by utilizing highly reactive anode materials such as lithium, sodium and the like, often in conjunction with high energy density nonaqueous liquid cathode materials and suitable salts, which are also referred to as cathode-electrolytes.

Galvanic cells typically are sealed to prevent loss of electrolyte by leakage. This is especially important in the case of nonaqueous liquid cathode cells, which typically employ highly reactive oxyhalide or halide cathode-electrolytes. Any escape of such liquids, or their reaction products, could cause damage to the device employing the cell, or to the surface of a compartment or shelf where the cell is stored.

On the other hand, certain operating conditions can cause the internal pressure of such liquid cathode cells to markedly increase. This pressure can be caused by external sources, such as fire, or internal sources, such as heat generated during charging. In certain situations, the anode can melt and react directly with the liquid cathode. In the case of other galvanic cells, such as alkaline-zinc cells, carbon-zinc cells, etc., such cells may enerate large quantities of gas under certain conditions of use. Thus, if any of the foregoing cells were permanently sealed, the build up of internal pressure within the cell could cause the cell container to leak, bulge or even rupture, which can cause property and/or bodily damage.

It is therefore necessary to provide a vent for galvanic cells that is designed to remain sealed during normal operating conditions which the cell may encounter, but which will open when the pressure within the cell substantially increases. In the case of liquid cathode cells employing, for example, a lithium anode, the vent must open before the lithium melts and reacts directly with the liquid cathode. Upon venting, most of the liquid cathode material is removed and is thus unavailable for reaction with the anode.

To meet these objectives, cells have been made with an electrically insulative frangible material, typically a glass or ceramic, disposed within and secured to a vent orifice that is typically located in the cell cover, so as to hermetically seal the vent orifice.

In one type of cell, referred to as a flat cell, a short, cylindrical container holds a wafer-like anode comprising an active anode material, such as lithium, disposed over and separated from a wafer-like cathode comprising an active cathode material, such as manganese dioxide.

A container cover disposed over and separated from the anode is hermetically sealed to the cell container. The cathode, which rests on the bottom of the cell container, is in physical (and thus electrical) contact with the container, so as to make the container the positive electrode of the cell. In contrast, the anode is electrically isolated from the container.

So that electrical contact can be established with the anode, a disk-shaped current collector plate is disposed over and placed in physical (and thus electrical) contact with the anode, and a collector insulator is placed between the current collector plate and the cover to maintain the electrical isolation of the anode from the container. A cylindrical pin is placed in electrical contact with the current collector plate and disposed to protrude through an orifice in the cell cover to form a negative electrode terminal. It is the typical practice to weld the cylindrical pin to the collector plate, so that the electrical resistance of the junction between the current collector and the cylindrical pin is low. An annular seal made of an electrically insulative frangible material is disposed within the orifice between the pin and the cell cover to hermetically seal the cell. When pressure within the cell reaches an unacceptably high level, the frangible material breaks, which should allow the cell to vent the excess pressure contained within it without rupturing.

Unfortunately, the construction of the cell can potentially interfere with safe venting. Upon the fracture of the frangible seal, the gases between the container cover and the collector plate quickly escape, while those between the collector plate and the bottom of the container encounter more resistance in their flow path and thus escape more slowly. In consequence, a pressure differential arises between the front and back of the collector plate, which urges the collector plate against the collector insulator, thereby partially resealing the cell. Thus, despite the frangible seal having fractured, there is no clear escape path for the gases within the cell, and the potential for destructive disassembly of the cell remains.

SUMMARY OF THE INVENTION

This invention comprises a cell housing containing an active anode material, an active cathode material, and a current collector member contained within the cell housing that is in electrical contact with one of the active materials. The cell additionally comprises an electrically conductive pin member having a first portion that protrudes from the cell through an orifice in the cell housing, with the pin member being sealed in the orifice by sealing means. Means for releasably securing a second portion of the pin member within an aperture in the current collector member is also provided, which establishes electrical contact between the pin member and the current collector member. When the internal pressure within the cell exceeds a predetermined pressure limit, the pin member is ejected from the cell due to the pressure differential between the inside and the outside of the cell, thereby allowing pressure within the cell to be released through the aperture in the current collector member and the orifice in the cell housing.

The specific features of this invention are described in detail below.

DESCRIPTION OF THE PREFERRED EMBODIMENTS

Figure 1:
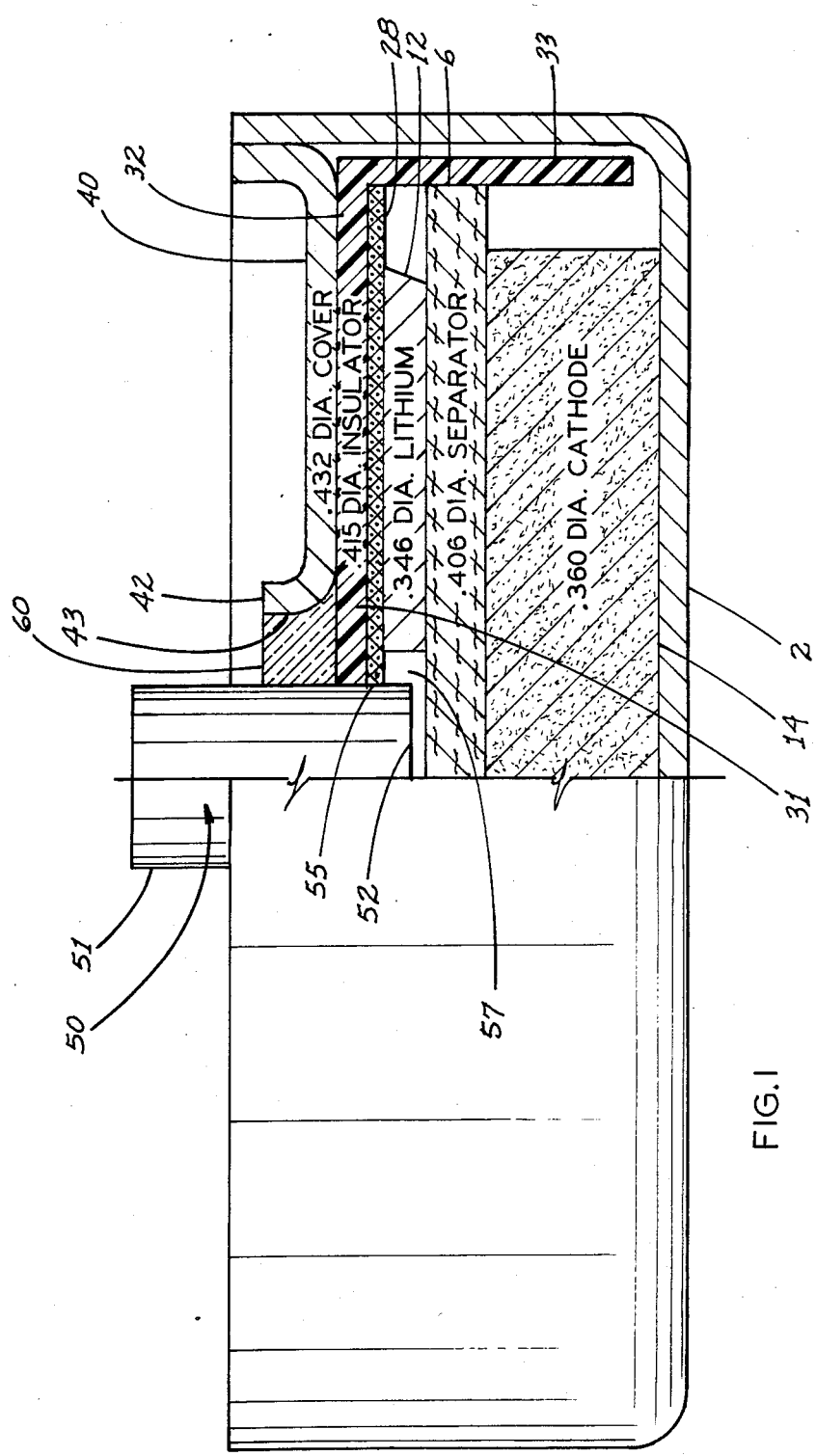
FIG. 1 is a cross-sectional view of a first cell fabricated in accordance with this invention.

Referring in detail to FIG. 1, there is shown a cross-sectional view of a cylindrical cell that employs the present invention, although this invention is equally suitable for cells having other geometric shapes. The housing of the cell is defined principally by an open-ended cell container 2 of a conductive material, such as stainless steel, and a cell cover 40 also of a conductive material, such as stainless steel. The cover is secured to cell container 2, as by laser welding the two components together. The cell contains anode 12 and cathode 14.

Anode 12 generally is a consumable metal and can be an alkali metal, an alkaline earth metal, or an alloy of alkali metals or alkaline earth metals with each other and other metals ("alloy" as used herein includes mixtures, solid solutions such as lithium-magnesium, and intermetallic compounds such as lithium monoaluminide). The preferred materials for anode 12 are the alkali metals, particularly lithium, sodium and potassium, and the alkaline earth metals, particularly calcium and magnesium. In the embodiment shown in FIG. 1, anode 12 is in the form of a relatively thin disk-like wafer of lithium.

The active cathode material of cathode 14 can be a solid, such as manganese dioxide, iron disulfide, titanium disulfide, antimony trisulfide, molybdenum trisulfide, niobium triselenide, bismuth oxide, vanadium pentoxide, or a polycarbon fluoride such as $(C_2F)n$ or $(CF_x)n$ (where x ranges from greater than 0.0 of about 1.2), or mixtures thereof. The active cathode material is mixed with a binder and a conductor to form a disk-like cathode 14, as shown in FIG. 1, which is separated from anode 12 by a separator 6. The separator 6 should be electrically non-conductive, but ionically permeable so as to allow ion transport between anode 12 and cathode 14. Accordingly, separator 6 can be a felted glass fiber fabric that is impregnated with a liquid electrolyte, such as a mixture of equal parts of propylene carbonate and dimethoxyethane containing one molar $LiCF_3SO_3$. A solid electrolyte can also be used in lieu of separator 6 and a liquid electrolyte.

Alternatively, the active cathode material of cathode 14 can be a liquid cathode-electrolyte that is dispersed within an appropriate porous cathode collector. In this case, the cathode-electrolyte comprises a solution of an ionically conductive solute dissolved in an active cathode depolarizer. The cathode depolarizer can be a liquid oxyhalide of an element of Group V or Group VI of the Periodic Table, such as sulfuryl chloride, thionyl chloride, phosphorus oxychloride, thionyl bromide, chromyl chloride, vanadyl tribromide and selenium oxychloride, or other suitable materials, such as sulfur dioxide.

Also usable as a cathode depolarizer is a halide of an element of Group IV to Group VI of the Periodic Table, such as sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, tin bromide trichloride, tin dibromide dichloride and tin tribromide chloride.

The solute for use in the cathode-electrolyte can be a simple or double salt which will produce an ionically conductive solution. Preferred solutes for nonaqueous systems are complexes of inorganic or organic Lewis acids and inorganic ionizable salts. Typical Lewis acids suitable for use in conjunction with liquid oxyhalide cathode depolarizers include aluminum fluoride, aluminum bromide, aluminum chloride, antimony pentachloride, zirconium tetrachloride, phosphorous pentachloride, boron fluoride, boron chloride and boron bromide. Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

If desired, and specifically for the halides, a cosolvent should be added to the cathode-electrolyte to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

The porous cathode collector has to be electronically conductive so as to permit external electrical contact to be made with the active cathode material and also to provide extended area reaction sites for the cathodic electrochemical processes of the cell. Materials suitable for use for the cathode collector shell are carbon materials and metals such as nickel, with acetylene black being preferable. In addition, the cathode collector, when made of a particulate material, should be capable of being molded directly within container 2 or capable of being molded into variously sized discrete bodies that can be handled without cracking or breaking. If a cathode collector is fabricated from a carbonaceous material, a suitable binder, with or without stabilizers, can be added to the cathode collector materials. Suitable binders for this purpose are vinyl polymers, polyethylene, polypropylene, polyacrylics, polystyrene and the like. For example, polytetrafluoroethylene would be the preferred binder for the cathode collector if the cell shown in FIG. 1 were used with a liquid oxyhalide cathode depolarizer. It is important that the materials selected for the cathode collector be chemically stable in the cell in which they are to be used.

The cathode 14 shown in FIG. 1 is in physical contact with the inner surface of the bottom of cell container 2, thereby electrically connecting cathode 14 to container 2 so as to make the container the positive electrode terminal of the cell. It is preferred that a conductive material, such as carbon, be coated on the inner surface of the bottom of cell container 2, to provide a low resistance contact therebetween. Separator 6 is disposed on cathode 14 and anode 12 is disposed on separator 6. A disk-shaped current collector plate 28 made, for example, of 304 stainless steel or molybdenum, is positioned against and in electrical contact with anode 12. Preferably, current collector plate 28 is ultrasonically welded to anode 12. Both anode 12 and current collector plate 28 are electrically insulated from cell container 2 and cell cover 40 by insulator 31, which comprises a disk-shaped insulating section 32 disposed between collector plate 28 and cell cover 40, and an insulative skirt 33 depending from the edge of insulating section 32 so as to circumscribe the periphery of each of collector plate 28, anode 12, and separator 6, as well as most of the periphery of cathode 14. Insulator 31 should be made of a material that is compatible with the cell components, such as polypropylene or Tefzel ®, available from E. I. Du Pont de Nemours & Co., Wilmington, Delaware.

Cell cover 40 contains an orifice 43, which, as can be seen in FIG. 1, may be defined by an upturned circular flange 42. An electrically conductive pin member 50, which has a first portion 51, protrudes through the orifice 43. A second portion 52 of pin member 50 is releasably secured in an aperture 55 in collector plate 28, as explained in greater detail below, and is in electrical contact with collector plate 28 so as to act as the negative electrode terminal of the cell.

An annular seal member 60 is disposed in orifice 43 between circular flange 42 and pin member 50. Seal member 60 is fused to both circular flane 42 and pin member 50 to hermetically seal the cell and secure pin member 50 in its proper location. Seal member 60 should be made of a frangible, insulative material that will electrically isolate pin member 50 from cell cover 40. Also, when the pressure within the cell reaches a certain level, such a material will fracture to form a path, or contribute to forming a path, from inside the cell to the atmosphere for the release of excess pressure. Seal member 60 is preferably made of a glass, such as borosilicate glass, or a ceramic material, such as alumina.

Pin member 50 can be releasably secured in aperture 55 of collector plate 28 by being press-fitted into aperture 55 so as to provide an interference fit. The aperture 55 can have any shape (e.g., circular, triangular, square) provided that some portion of it makes firm contact with pin member 50 so as to provide a reliable electrical contact between collector plate 28 and pin member 50 that has relatively low electrical resistance. Pin member 50 can also have any cross-sectional shape (e.g., circular, triangular, square) and can be formed from a variety of materials, such as ribbon, rod, or wire stock, or tubular material that is sealed off after the cell assembly is completed. Pin member 50 is made of an electrically conductive material, such as molybdenum or 446 stainless steel.

In normal operation of the cell, pin member 50 functions as the negative electrode terminal and seal member 60 prevents any passage of material from inside the cell to the atmosphere. However, if the pressure within the cell should exceed a predetermined level, the pressure causes seal member 60 to fracture. The fractured seal no longer acts to retain pin member 50 and therefore the pressure differential between the inside and the outside of the cell forces second portion 52 of pin member 50 from aperture 55 and ejects pin member 50 (along with some portion of seal member 60 that is attached to pin member 50) from the cell. The ejection of pin member 50 opens up orifice 43 and aperture 55 and thus results in a clear path for material to be vented from inside the cell, both from in front of collector plate 28 (through orifice 43) and from behind collector plate 28 (through aperture 55 and orifice 43). Thus, the pressure that caused seal member 60 to fracture is safely vented from the cell. The fit between pin member 50 and aperture 55 should allow pin member 50 to be released when the pressure is sufficient to fracture seal member 60. It is also possible, but less likely, that pressure in excess of the predetermined level will cause pin member 50 to be ejected without fracturing seal member 60. Even in that case however, a clear path for material to be vented from inside the cell will result.

Figure 3:
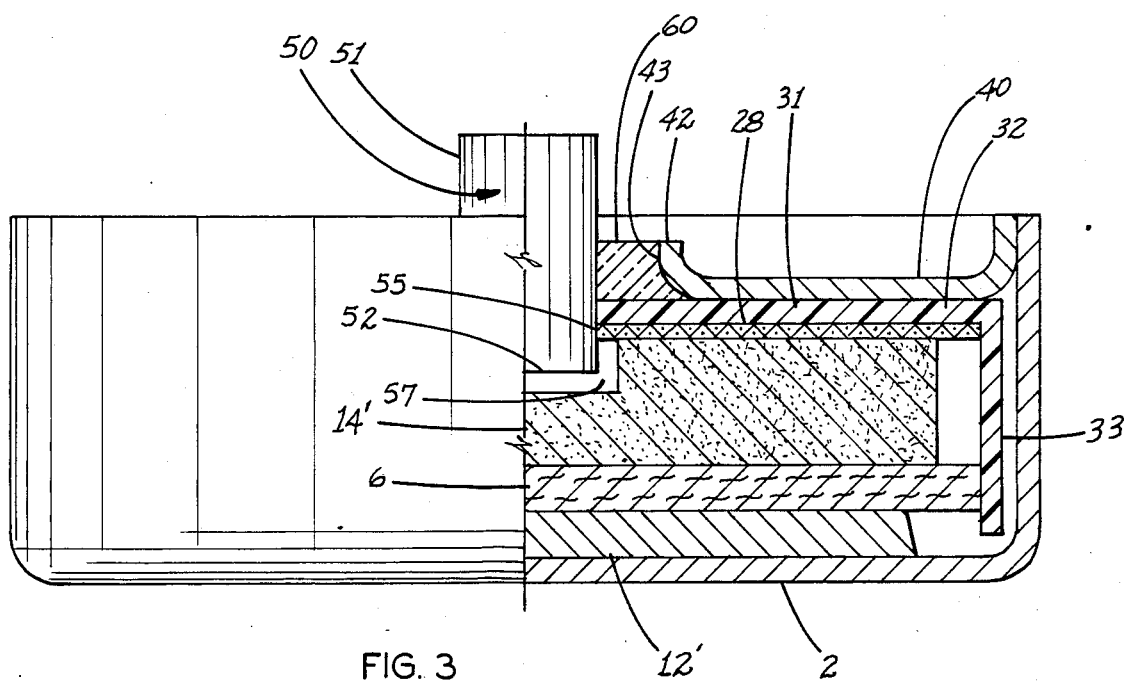
FIG. 3 is a cross-sectional view of a second cell fabricated in accordance with this invention.

While the embodiment shown in FIG. 1 features pin member 50 as the negative terminal and container 2 as the positive terminal, the present invention works equally well with the polarity of pin member 50 and container 2 reversed. Indeed, such a reversed polarity is preferred for higher voltage cell systems, such as the lithium-manganese dioxide system, in order to inhibit the corrosion of seal member 60 and the deposition of corrosion products thereon that could cause the cell to self-discharge. FIG. 3 shows such an embodiment, wherein like numerals to those found in FIG. 1 denote like structure. In FIG. 3, anode 12' is in electrical contact with container 2 and cathode 14' is in electrical contact with current collector plate 28. The cell of FIG. 3 is otherwise substantially similar to the cell of FIG. 1.

Figure 2A:
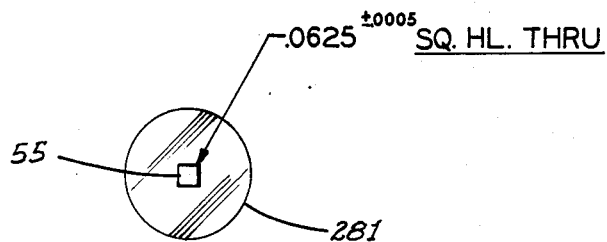
FIG. 2a is a plan view of one embodiment of a current collector plate usable in the cell shown in FIG. 1.

As stated above, pin member 50 and aperture 55 can be of a variety of shapes. However, where both are circular in cross-section, it has been found that substantial force is needed to press-fit pin member 50 into aperture 55. In fabricating the cell of FIG. 1, cover 40 is assembled with pin member 50 and annular seal member 60, and then that assembly is attached as a unit to cell container 2. During such attachment, it is therefore possible to damage annular seal member 60 (and/or the bond between seal member 60 and pin member 50, and between seal member 60 and circular flange 42), if substantial force is needed to axially press pin member 50 into aperture 55. Thus it is preferred in one embodiment of this invention for current collector plate 28 to have the configuration of plate 281, as shown in FIG. 2A, with aperture 55 being square in shape, and for pin member 50 to be cylindrical. The reguired press-fit can then be accomplished with only a moderate amount of force, yet good electrical contact results between pin member 50 and collector plate 28, and ejection of pin member 50 occurs when pressure causes seal member 60 to fracture. For example, a disk-like collector plate 28 0.005 inch thick and having a diameter of about 0.4 inch can be fabricated with a 0.0625 inch square aperture 55, into which a 0.065 inch diameter cylindrical pin member 50 can be press-fitted.

Figure 2B:
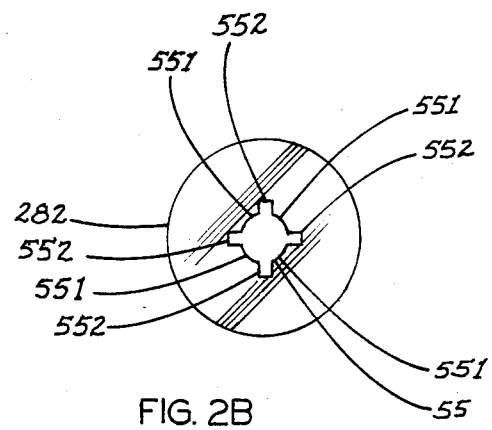
FIG. 2b is a plan view of a second embodiment of a current collector plate usable in the cell shown in FIG. 1.

Another embodiment of current collector plate 28 is plate 282, shown in FIG. 2B, whose aperture 55 is a castellated circular aperture. As shown in FIG. 2B, the circumference of aperture 55 is interrupted by four radially inwardly directed tabs 551 spaced at equal intervals about the circumference so as to define four radially directed slits 552. The distance across tabs 551 is made smaller than the diameter of a cylindrical pin member 50. Thus, when pin member 50 is urged into aperture 55, the castellated portion of plate 28 will deform and allow pin member 50 to be pressed axially into aperture 55 with only a moderate amount of force. The deformed portion of plate 28 thereafter firmly secures pin member 50 to plate 28, thereby ensuring a good electrical connection, while allowing ejection of pin member 50 when pressure causes seal member 60 to fracture.

An annular space 57, located adjacent to second portion 52 of pin member 50 and under collector plate 28, can accommodate any local deformation of collector plate 28 that results from the press-fitting operation. Space 57 also minimizes the possibility of a soft anode material, such as lithium, being extruded through aperture 55 during cell assembly, and then coming into physical contact with seal member 60, which can cause undesirable corrosion of member 60.

To fabricate the cell shown in FIG. 1, seal member 60 is positioned within orifice 43 of cell cover 40, and pin member 50 is positioned within seal member 60. This assembly is then heated to seal pin member 50 and the periphery of orifice 43 to seal member 60. Next, the assembly is inverted, a preformed current collector plate 28 is ultrasonically welded to a preformed anode 12, a preformed insulator 31 is placed over pin member 50, and aperture 55 of the current collector plate (to which is welded the anode) is press-fitted onto pin member 50. A preformed separator 6 is then placed on anode 12 and the electrolyte is dispensed onto the separator. Cathode 14 is next placed on separator 6, and container 2 is placed over this assembly. The cell is then turned right-side up, cover 40 is properly seated on container 2, and the cell is welded shut.

Several electrochemical cells were fabricated to demonstrate the utility of the present invention. Specifically, a number of control cells were fabricated using a stainless steel container 0.146 inch high and 0.453 inch in diameter, with a wall thickness of 0.010 inch. Each cell contained a 0.020 inch thick lithium wafer approximately 0.340 inch in diameter disposed against and attached to a stainless steel current collector plate. Each cell also had a cylindrical pin member protruding through a glass seal disposed in an orifice in the cell cover, with the pin member being welded to the collector plate. A solid cathode 0.060 inch thick and approximately 0.360 inch in diameter and using manganese dioxide as its active material rested against the bottom of the container. The cathode was separated from the anode by a felted glass fiber fabric separator impregnated with a liquid electrolyte mixture of 50% propylene carbonate and 50% dimethoxyethane containing one molar $LiCF_3SO_3$.

A number of test cells were also made which had a construction as described above, except that in each the cylindrical pin member, rather than being welded to the collector plate, was releasably fastened to it, specifically by fabricating the collector plate with a square aperture as shown in FIG. 2A, and press-fitting the pin member into this aperture. Yet other test cells employing this pin member-collector plate construction were made, except that a liquid cathode-electrolyte of $SOCl_2$-1M $LiAlCl_4$, dispersed in a polytetrafluoroethylenebonded porous carbon cathode collector, was used in lieu of the solid cathode and liquid electrolyte combination referred to above.

Both test cells and control cells were subjected to three types of abuse tests, as follows: (1) 300° C. hot plate test —a cell is placed vertically on the surface of a hot plate previously heated to 300° C.; (2) 300° C. hot tube test—a tube is placed in the well of an electric furnace set to 300° C., and a cell is inserted upright into the tube; and (3) 600° C. direct flame test—a cell is secured horizontally on a metal screen 3.5 inches above a Fisher burner having a 6 inch flame height, and the 600° C. test temperature is reached within 30 seconds.

In both the hot plate and hot tube tests, the control cells either exploded or were grossly distorted. In contrast, the test cells fabricated in accordance with this invention safely vented within 1 to 2 minutes, with the pin member being ejected (with some portion of the glass seal attached thereto) and the remainder of the cell being intact. Similarly, the control cells subjected to the direct flame test also either exploded or were grossly distorted, whereas the cells made in accordance with this invention safely vented within 30 seconds to 1 minute, with the pin member and some glass seal being ejected and the remainder of the cell being intact.

We claim:
1. An electrochemical cell, comprising:
   (a) a cell housing that contains an active anode material and an active cathode material;
   (b) an electrically conductive current collector member within the cell housing that is in electrical contact with one of the active materials;
   (c) an electrically conductive pin member having a first portion that protrudes from the cell through an orifice in the cell housing;
   (d) means for sealing the pin member to the orifice, so as to seal the interior of the cell from its surroundings; and
   (e) means for releasably securing a second portion of the electrically conductive pin member within an aperture in the current collector member so as to establish electrical contact between the pin member and the current collector member, and so that when the pressure within the cell exceeds a predetermined pressure limit, the pin member is ejected from the cell due to the pressure differential between the inside and outside of the cell, thereby allowing pressure within the cell to be released through the aperture in the current collector member and the orifice in the cell housing.

2. The electrochemical cell as in claim 1, wherein the current collector member is a current collector plate made of an electrically conductive material, and the means for releasably securing the second portion of the electrically conductive pin member in the aperture in the current collector plate is an interference fit between the pin member and the aperture that also results in electrical contact between the collector plate and the pin member, so that when the pressure within the cell exceeds a predetermined pressure limit, the pin member is ejected from the cell due to the pressure differential between the inside and outside of the cell, thereby allowing pressure behind the collector plate to be released through the aperture in the collector plate and the orifice in the cell housing.

3. The electrochemical cell as in claim 2, wherein the pin member is approximately cylindrical and the aperture in the current collector plate is approximately square in shape.

4. The electrochemical cell as in claim 2, wherein the pin member is approximately cylindrical and the aperture in the current collector plate is approximately circular in shape, and the aperture has a plurality of radially inwardly directed tabs spaced about its circumference.

5. The electrochemical cell as in claim 1, wherein the means for sealing the pin member to the orifice is a frangible material disposed between the pin member and the wall defining the orifice in the cell housing.

6. The electrochemical cell as in claim 5, wherein the frangible material is an electrical insulator, the active anode material is in electrical contact with the current collector member and is electrically isolated from the cell housing, and the cell housing is electrically conductive and in electrical contact with the active cathode material.

7. The electrochemical cell as in claim 6, wherein the active cathode material is a solid.

8. The electrochemical cell as in claim 7, wherein the active cathode material is selected from the group consisting of manganese dioxide, iron disulfide, titanium disulfide, antimony trisulfide, polycarbon fluorides, niobium triselenide, bismuth oxide, vanadium pentoxide, and mixtures thereof.

9. The electrochemical cell as in claim 6, wherein the active cathode material is a liquid dispersed in a porous conductive cathode collector, and wherein the porous conductive cathode collector is in electrical contact with the cell housing.

10. The electrochemical cell as in claim 9, wherein the active cathode material is selected from the group consisting of sulfuryl chloride, thionyl chloride, phosphorous oxychloride, thionyl bromide, chromyl chloride, vanadyl tribromide, sulfur dioxide and selenium oxychloride.

11. The electrochemical cell as in claim 6, wherein the active anode material is selected from the group consisting of lithium, sodium, potassium, calcium and magnesium.

12. The electrochemical cell as in claim 5, wherein the frangible material is an electrical insulator, the active cathode material is in electrical contact with the current collector member and is electrically isolated from the cell housing, and the cell housing is electrically conductive and in electrical contact with the active anode material.

13. The electrochemical cell as in claim 12, wherein the active cathode material is selected from the group consisting of manganese dioxide, iron disulfide, titanium disulfide, antimony trisulfide, polycarbon fluorides, niobium triselenide, bismuth oxide, vanadium pentoxide, and mixtures thereof.

14. The electrochemical cell as in claim 12, wherein the active anode material is selected from the group consisting of lithium, sodium, potassium, calcium and magnesium.

15. The electrochemical cell as in claim 5, wherein the frangible material is an electrical insulator, the active cathode material is a liquid dispersed in a porous conductive cathode collector, said porous conductive cathode collector being in electrical contact with the current collector member and electrically isolated from the cell housing, and the cell housing being electrically conductive and in electrical contact with the active anode material.

16. The electrochemical cell as in claim 15, wherein the active cathode material is selected from the group consisting of sulfuryl chloride, thionyl chloride, phosphorous oxychloride, thionyl bromide, chromyl chloride vanadyl tribromide sulfur dioxide and selenium oxychloride.

17. The electrochemical cell as in claim 15, wherein the active anode material is selected from the group consisting of lithium, sodium, potassium, calcium and magnesium.

* * * * *